United States Patent
Kishimoto et al.

(10) Patent No.: US 11,443,212 B2
(45) Date of Patent: Sep. 13, 2022

(54) LEARNING POLICY EXPLANATIONS

(71) Applicant: INTERNATIONAL BUSINESS MACHINES CORPORATION, Armonk, NY (US)

(72) Inventors: Akihiro Kishimoto, Dublin (IE); Radu Marinescu, Dublin (IE); Spyros Kotoulas, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 406 days.

(21) Appl. No.: 16/264,555

(22) Filed: Jan. 31, 2019

(65) Prior Publication Data
US 2020/0250557 A1 Aug. 6, 2020

(51) Int. Cl.
| G06N 5/04 | (2006.01) |
| G06N 5/00 | (2006.01) |
| G06N 5/02 | (2006.01) |
| G06N 20/00 | (2019.01) |

(52) U.S. Cl.
CPC ............ *G06N 5/045* (2013.01); *G06N 5/006* (2013.01); *G06N 5/025* (2013.01); *G06N 20/00* (2019.01)

(58) Field of Classification Search
None
See application file for complete search history.

(56) References Cited

U.S. PATENT DOCUMENTS

| 5,408,587 | A | 4/1995 | Maier et al. |
| 8,032,822 | B1 | 10/2011 | Artamonov et al. |
| 8,092,227 | B2 | 1/2012 | Roschelle et al. |
| 9,659,056 | B1 | 5/2017 | Chechik et al. |
| 9,836,530 | B2 | 12/2017 | Priel et al. |
| 9,973,520 | B2 | 5/2018 | Pevny |
| 2001/0017622 | A1 | 8/2001 | Patel et al. |
| 2010/0145734 | A1* | 6/2010 | Becerra ............... G06Q 40/08 705/4 |
| 2014/0351258 | A1* | 11/2014 | Dayan ............... G06F 16/353 707/740 |
| 2017/0004723 | A1 | 1/2017 | Marsh et al. |
| 2017/0308525 | A1 | 10/2017 | Koutrika et al. |
| 2018/0032492 | A1 | 2/2018 | Altshuller et al. |
| 2018/0046965 | A1* | 2/2018 | Berlandier ...... G06Q 10/06316 |
| 2018/0114275 | A1 | 4/2018 | Wang et al. |
| 2018/0144126 | A1* | 5/2018 | Swinke .............. G06N 20/00 |
| 2018/0157661 | A1 | 6/2018 | Zoldi et al. |
| 2018/0165708 | A1* | 6/2018 | Bajaj ............... G06Q 30/0277 |

OTHER PUBLICATIONS

Automated Theorem Proving in Intuitionistic Propositional Logic by Deep Reinforcement Learning (Katsumoto et al.) taken from https://arxiv.org/abs/1811.00796 (Year: 2018).*

(Continued)

*Primary Examiner* — Li Wu Chang
(74) *Attorney, Agent, or Firm* — Griffiths & Seaton PLLC

(57) ABSTRACT

Various embodiments are provided for learning policy explanations in a computing environment by a processor. One or more explanations may be provided that justify validity or invalidity of a claim based on one or more rules extracted from one or more segments of text data of a policy data source using a machine learning operation.

15 Claims, 9 Drawing Sheets

(56) References Cited

OTHER PUBLICATIONS

Combining NLP Approaches for Rule Extraction from Legal Documents (Dragoni, et al.) taken from https://hal.archives-ouvertes.fr/hal-01572443/document (Year: 2016).*

"Automatic Generation Of Explanation For Expert Systems Implemented With Different Knowledge Representations" Ahmed Fouad Said et al. Central Lab for Agricultural Expert Systems Ministry of Agriculture and Land Reclamation, Issue 1, vol. 8, Jan. 2009 (10 Pages).

"On Computing Explanations in Argumentation," Xiuyi Fan and Francesca Toni fx.fan09,f.tonig@imperial.ac.uk Department of Computing, Imperial College London, SW7 2AZ, UK (7 Pages).

"Generating Explanations for Biomedical Queries" Esra Erdem, Umut Oztok Sabanci University, Orhanli, Tuzla, Istanbul 34956, Turkey, 24, Sep. 2013 (66 Pages).

"Using Contextual Graphs for Supporting Qualitative Simulation Explanation" Mohamed El Habib LARABA, Patrick Brezillon, Lire Laboratory—University Mentouri of Constantine LIP6, case 169, University Paris 6 Route de Ain El Bey, 25000 Algeria 104 av. du Président Kennedy, 75016, France ( 6 Pages).

* cited by examiner

600

// Predicates

*Person(person)
*Age(person, age)
*Eligible(person)
*Service(service)
*Type(service, type)
*Units(claim, service, units)
WithinLimit(claim, service, units)
OverLimit(claim, service, units)
ServiceCovered(claim, person, service)
*Limit(service, units)
*HasPAR(claim, person, service)
*Claim(claim)
Child(person)
Adult(person)
Valid(claim)
Invalid(claim)
Unknown(claim)

// Rules
// A REHAB service is always covered
4 Person(x), Claim(c), Service(s), Type(s, "REHAB") =>
ServiceCovered(c, x, s)
// A child requires PAR to have a HABIL service covered
4 Child(x), Claim(c), Type(s, "HABIL"), HasPAR(c, x, s) =>
ServiceCovered(c, x, s)
// An adult requires PAR and must be eligible to have a HABIL service covered
4 Adult(x), Claim(c), Type(s, "HABIL"), Eligible(x), HasPAR(c, x, s) =>
ServiceCovered(c, x, s)

// A child is a person aged 20 and under
Person(x), Age(x, a), [a<=20] => Child(x).
// An adult is a person aged 21+
Person(x), Age(x, a), [a>=21] => Adult(x).

// Claimed units within or over limit for a service
4 Claim(c), Units(c, s, u), Limit(s, l), [u <= l] => WithinLimit(c, s, u)
4 Claim(c), Units(c, s, u), Limit(s, l), [u > l] => OverLimit(c, s, u)
// Valid claim: units within limit and service covered
4 Person(x), Claim(c), Service(s), WithinLimit(c,s,u), ServiceCovered(c,x,s) =>
Valid(c)
// Valid claim: units over limit and service covered (usually with PAR)
4 Person(x), Claim(c), Service(s), OverLimit(c,s,u), HasPAR(c,x,s) => Valid(c)
// Invalid claim (units over limit service not covered)
4 Person(x), Claim(c), Service(c), OverLimit(c,s,u), !ServiceCovered(c,x,s) =>
Invalid(c)
// Unknown claim
4 Valid(c), Invalid(c) => Unknown(c)

FIG. 6A

LEARNING POLICY EXPLANATIONS

BACKGROUND OF THE INVENTION

Field of the Invention

The present invention relates in general to computing systems, and more particularly to, various embodiments for learning policy explanations using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities. Digital and online information is an advantageous source of business intelligence that is crucial to an entity's survival and adaptability in a highly competitive environment. Also, many businesses and organizations, such as financial institutions, employing the use of computing systems and online data must ensure operations, practices, and/or procedures are in compliance with general business protocols, corporate compliance, and/or legal regulations, policies, or requirements.

SUMMARY OF THE INVENTION

Various embodiments for learning policy explanations in a computing environment by a processor are provided. In one embodiment, by way of example only, a method for learning policy explanations, again by a processor, is provided. One or more explanations may be provided justifying validity or invalidity of a claim based on one or more rules extracted from one or more segments of text data of a policy data source using a machine learning operation.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 6A-6B is a diagram depicting a correcting policy data in which aspects of the present invention may be realized;

DETAILED DESCRIPTION OF THE DRAWINGS

Figure 1:
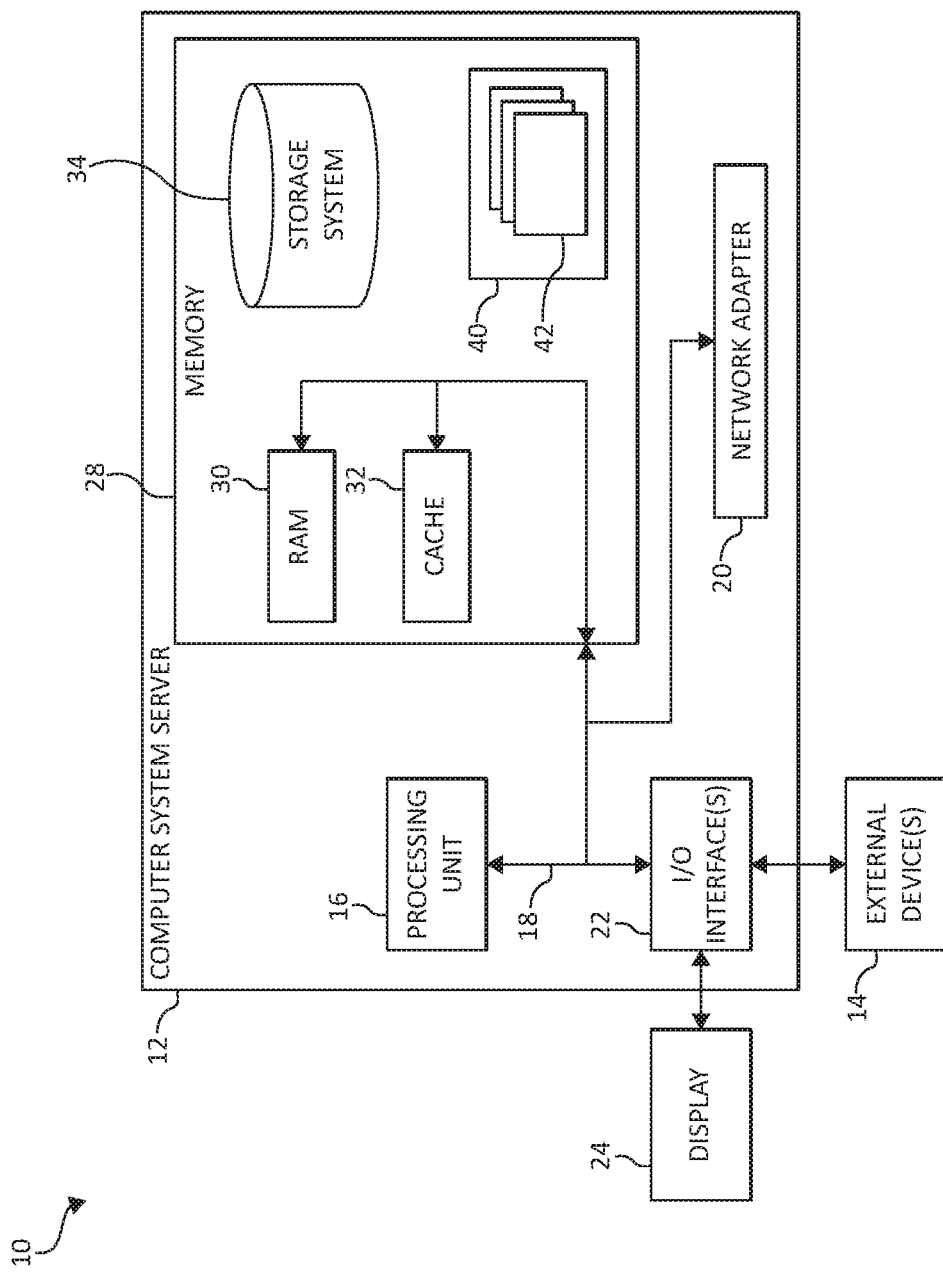
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of topics ranging from scientific, legal, educational, financial, travel, shopping and leisure activities, healthcare, and so forth. Many data-intensive applications require the extraction of information from data sources. The extraction of information may be obtained through a knowledge generation process that may include initial data collection among different sources, data normalization and aggregation, and final data extraction.

Moreover, some entities (e.g., insurance services offered by insurance companies such as, for example, healthcare, auto, home, etc.) are typically accompanied by multiple policies, which describe a number of rules under which these insurance services are applied. Most, if not all, of the policies are typically described in natural language (e.g., "a patient can only claim up to 48 units of physical therapy per year). In one aspect, depending on a type of policy, the policy may contain hundreds/thousands of rules, which may be checked (e.g., a policy document may consist of more than 100 pages). However, although policy claims are may be processed using a formal encoding of the policy rules a need exists for automatically processing the policy claims using the formal representation of the policy rules, marking the claims as invalid and/or valid because the policy claim violates one or more rules of the policy or satisfies all relevant policy rules, and providing one or more explanations (e.g., in natural language) having one or more reasons (e.g., most important reason(s)) and/or evidence that justify why the claim is invalid and/or valid.

As such, the present invention provides for learning policy explanations in a computing environment by a processor are provided. In one embodiment, the present invention provides one or more explanations justifying validity or invalidity of a claim based on one or more rules extracted from one or more segments of text data of a policy data source using a machine learning operation. Thus, the present invention may generate meaningful explanations even if the policy claim violates two or more rules. The explanations may be shorter explanations and contain only the most relevant information to a user. In this way, the present invention may identify providers that are committing fraud (which is oftentimes straightforward through statistical measures), identify what policies are violated, and provide an explanation of the violation.

In one aspect, an explanation component may determine (e.g., compute) a set of formal explanations (e.g., proof trees) as to why a policy claim was deemed invalid and/or valid). The explanation proof tree(s) may contain all relevant rules that were violated or satisfied by the policy claim. An active learning component may identify one or more explanations to the user. One or more explanations may be scored and ranked based on a scoring function that may be customized by the user. Those of the explanations that are most relevant explanations to the policy claim may be automatically selected (or selected by a user). Scores of the rules in a knowledge domain may be adjusted based on those rules included in the explanations selected (e.g., automatically and/or by the user). The score of each rule indicates and/or measures the probability (e.g., likelihood) that the rule will be included in a subsequent explanation.

In one aspect, one or more rules may be extracted from one or more segments of text data of a policy data source according to an active learning operation. The active learning may be applied to a previously extracted set of rules and revise, correct, update, and/or modify the scores of the rules in a knowledge base "KB" or knowledge domain. Active learning may be used to learn how to score the rules and assign and/or modify assigned scores/weights of the rules in the KB. Thus, the active learning may be used to build, maintain, update, and/or construct the KB. In this way, learning policy explanations may be employed using active learning.

Also, as used herein the term "domain" is a term intended to have its ordinary meaning. In addition, the term "domain" can include an area of expertise for a system or a collection of material, information, content and/or other resources related to a particular subject or subjects. For example, a domain can refer to a regulatory, legal, policy, governmental, financial, healthcare, advertising, commerce, scientific, industrial, educational, medical, biomedical-specific information, or other area or information defined by a subject matter expert. A domain can refer to information related to any particular subject matter or a combination of selected subjects.

The term "ontology" is also a term intended to have its ordinary meaning. For example, an ontology may include information or content relevant to a domain of interest or content of a particular class or concept. Content can be any searchable information, for example, information distributed over a computer-accessible network, such as the Internet. A concept or topic can generally be classified into any of a number of content concepts or topics which may also include one or more sub-concepts and/or one or more sub-topics. Examples of concepts or topics may include, but are not limited to, regulatory compliance information, policy information, legal information, governmental information, business information, educational information, or any other information group. The ontology can be continuously updated with the information synchronized with the sources, adding information from the sources to the ontology as models, attributes of models, or associations between models within the ontology.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
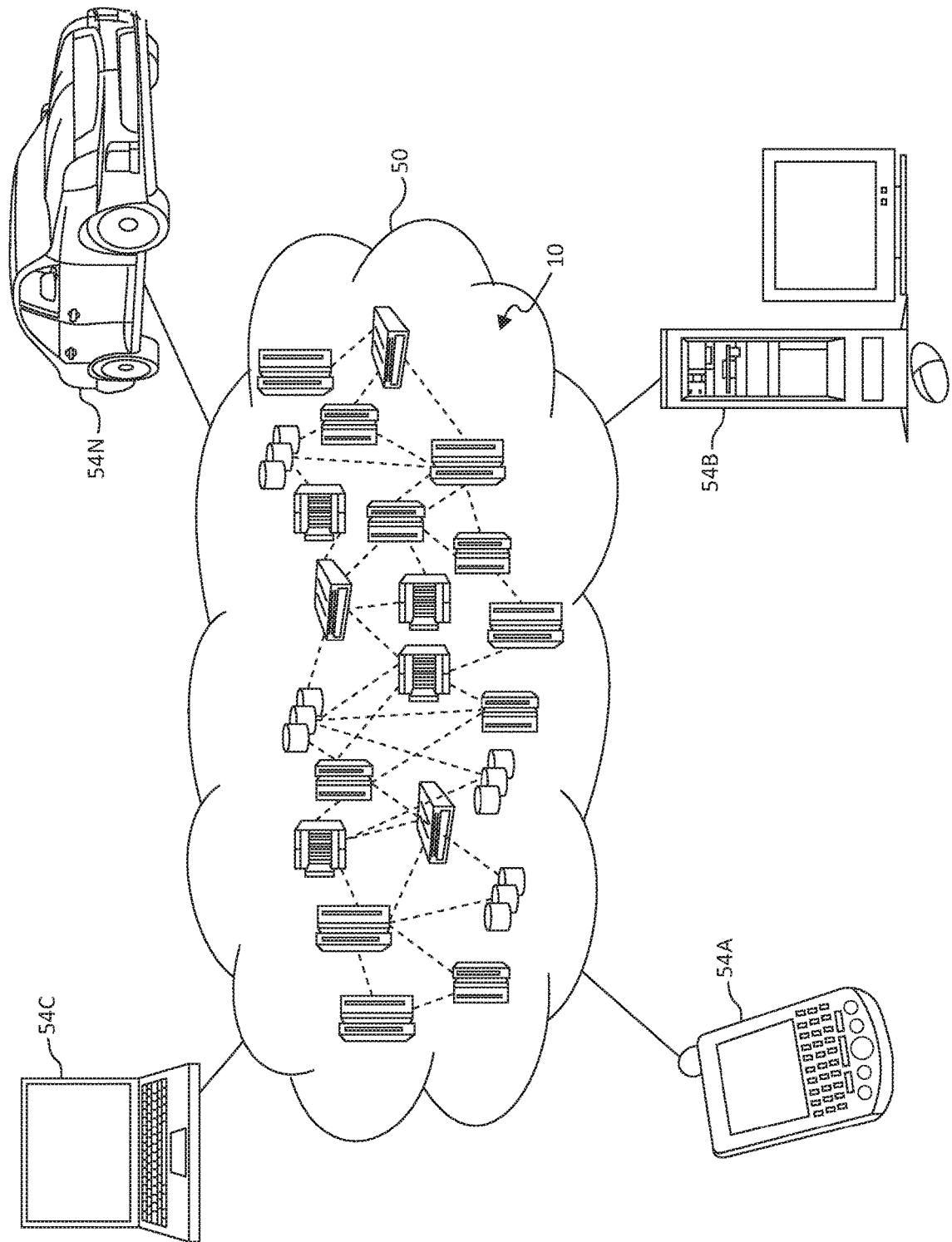
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
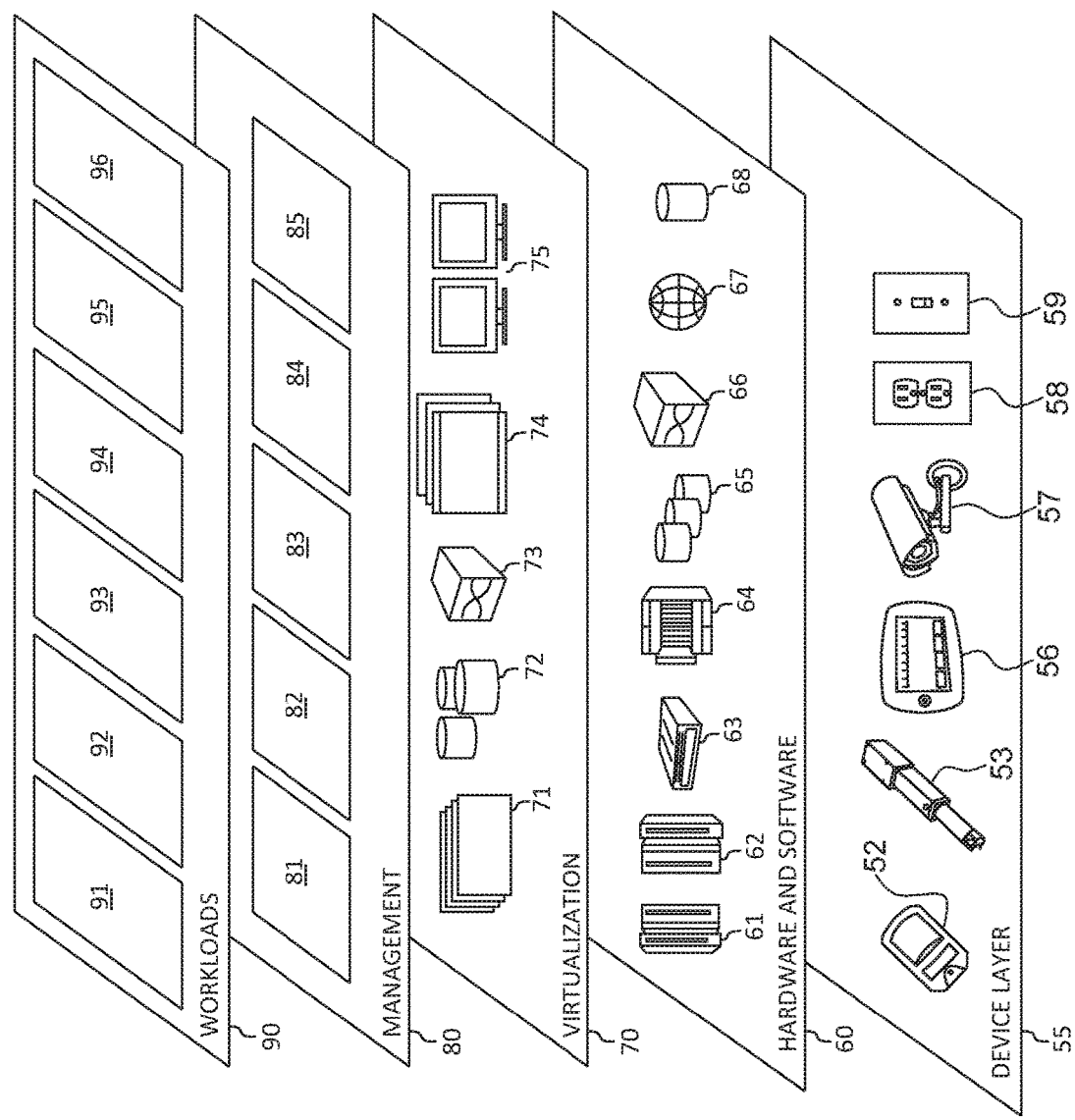
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for correcting policy rules. In addition, workloads and functions 96 for correcting policy rules may include such operations as analytics, entity and obligation analysis, and as will be further described, user and device management functions. One of ordinary skill in the art will appreciate that the workloads and functions 96 for correcting policy rules may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides a system that may provide learning of policy explanations. A collection of (consistent) policy rules may be received from a policy document. In one aspect, the rules may have been automatically extracted from text such as, for example, a maximum number of units of service that can be provided to the same patient in a period of time, as extracted from policies stored in a knowledge domain/database).

A claim may be marked as valid and/or invalid with respect to the policy rules. A set of explanations may be generated in the form of proof trees using an automated theorem prover. Each of the explanations may be ranked according to their relevance (as defined by the user or to optimize a set of criteria—e.g., size of the explanations in terms of rules included). A user may select a subset of these explanations. The scores of the rules in knowledge base may be adjusted based on the rules included in the explanations selected and not selected by the user.

For example, each rule has a score stored in the knowledge base and is adjusted based on the user feedback. The score of the explanation is calculated by using scores of the rules. More specifically, a theorem prover (e.g., automated theorem component 480 of FIG. 4) constructs a proof tree and the score of the proof tree is defined to be a sum of the scores of the rules appearing in the proof tree. The theorem prover attempts to find a proof tree that has the smallest score as compared to other scores. Then, an explanation is generated by a chain of rules in the proof trees (i.e., a portion of the proof tree), and the score of an explanation is the sum of the costs of the rules appearing in the chain. The theorem prover extracts several explanations (i.e., several chains of the rules) to present them to the user. The present invention regards the rules appearing in the explanation selected by the user as critical rules (e.g., which may have a defined level of priority), and the scores of these rules are reduced. It should be noted that one or more costs and/or the scores of rules in the explanations that are not selected may be increased.

Each rule is associated with a score representing a probability (e.g., likelihood) of including that rule in an explanation. The scoring function associated with an explanation (proof tree) that can be defined by the user. The scoring function may optimize one or more criteria (e.g., number of rules included, maximize sum of scores of included rules, etc.). A new set of rules with updated scores may be generated. Each rule may have a relevant natural text snippet (e.g., a few words, phrase, or defined number of words) associated with the rule (e.g., the text fragment from which the rule was originally extracted). A user and/or artificial intelligence ("AI") operation may be used to revise the rule score and/or explanations.

Each rule may be associated with a weight, indicating confidence in the rule, where users may also (optionally) update the rule weight. The system may provide a collection of corrected rules and corresponding updated weights of each rule. A scoring function may be used that can be defined such as to maximize a set of criteria (e.g., coverage or impact of the rule in a given use case).

Figure 4:
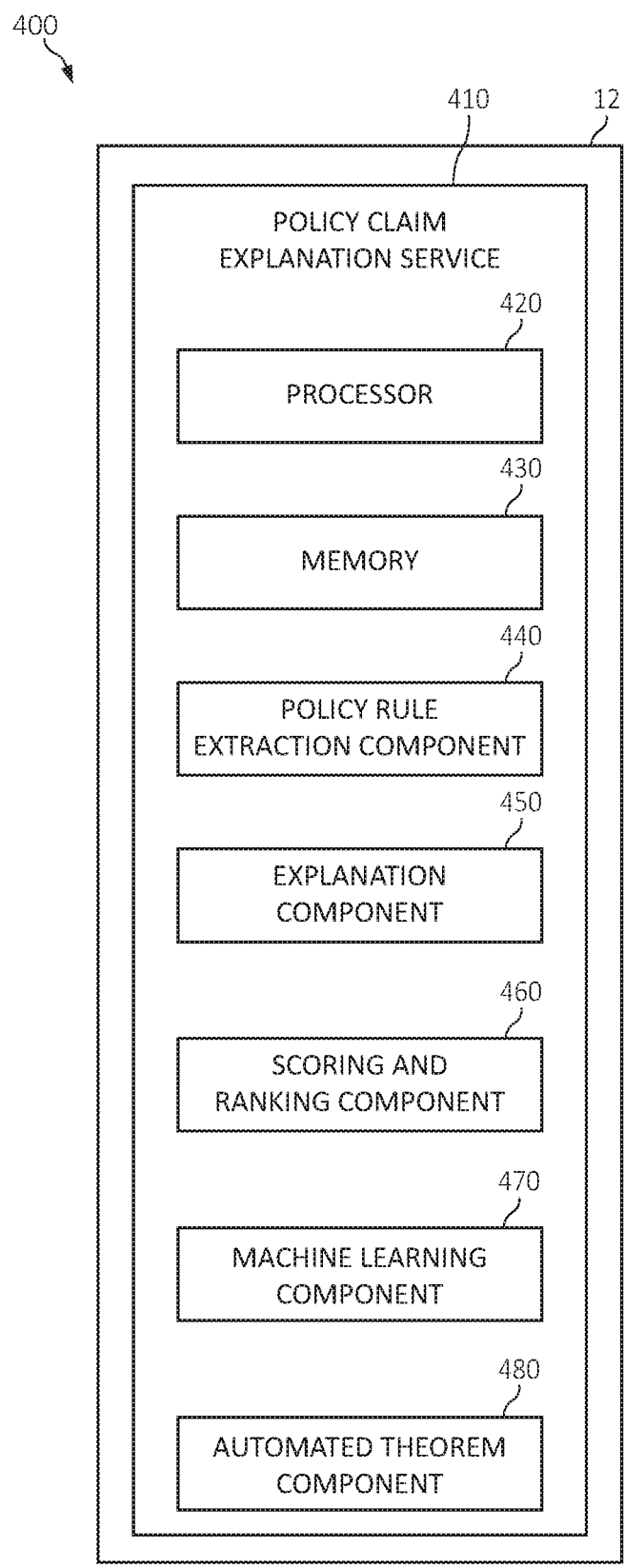
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A is shown, incorporating processing unit ("processor") 420 to perform various computational, data processing and other functionality in accordance with various aspects of the present invention. The policy claim explanation service 410 may be provided by the computer system/server 12 of FIG. 1. The processing unit 420 may be in communication with memory 430. The policy claim explanation service 410 may include a policy rule extraction component 440, an explanation component 450, a scoring and ranking component 460, a machine learning model component 470, and an automated theorem component 480.

As one of ordinary skill in the art will appreciate, the depiction of the various functional units in policy claim explanation service 410 is for purposes of illustration, as the functional units may be located within the policy claim explanation service 410 or elsewhere within and/or between distributed computing components.

The policy rule extraction component 440, in association with the machine learning component 470, may extract one or more rules from one or more segments of text data. The policy rule extraction component 440 may ingest the text data from a policy data source upon processing the text data using a lexical analysis, parsing, extraction of concepts, semantic analysis, a machine learning operation, or a combination thereof, and/or use natural language processing (NLP) to determine the set of rules from one or more segments of text data.

The explanation component 450, in association with the policy rule extraction component 440, may provide one or more explanations justifying validity or invalidity of a claim based on one or more rules extracted from one or more segments of text data of a policy data source using a machine learning operation. That is, the explanation component 450, in association with the automated theorem component 480, may generate the one or more explanations as proof trees using an automated theorem proving operation. That is, the automated theorem component 480 may generate a set of explanations in form of proof trees.

The explanation component 450, in association with the machine learning component 470, may collect feedback from a user for learning a degree of relevance of the one or more rules for inclusion or exclusion in the one or more explanations.

The scoring and ranking component 460 may assign a score to the one or more rules indicating a degree of relevance of the one or more rules for inclusion or exclusion in the one or more explanations according to a scoring operation. The scoring and ranking component 460 may rank each of the one or more rules according to the assigned score. The scoring and ranking component 460 may adjust a score of the one or more rules in a knowledge domain according to the assigned score to the one or more rules included in the one or more explanations.

The machine learning component 470 may learn, determine, or identify the explanations providing one or more reasons/evidence why a policy claim has been deemed invalid and/or valid. The explanation tree contains all relevant rules that were violated (or satisfied) by the claim. The machine learning component 470 may learn, determine, or identify the one or more rules and one or more user-provided modifications to the one or more rules, and/or revise the one or more rules according to collected feedback from a user.

By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
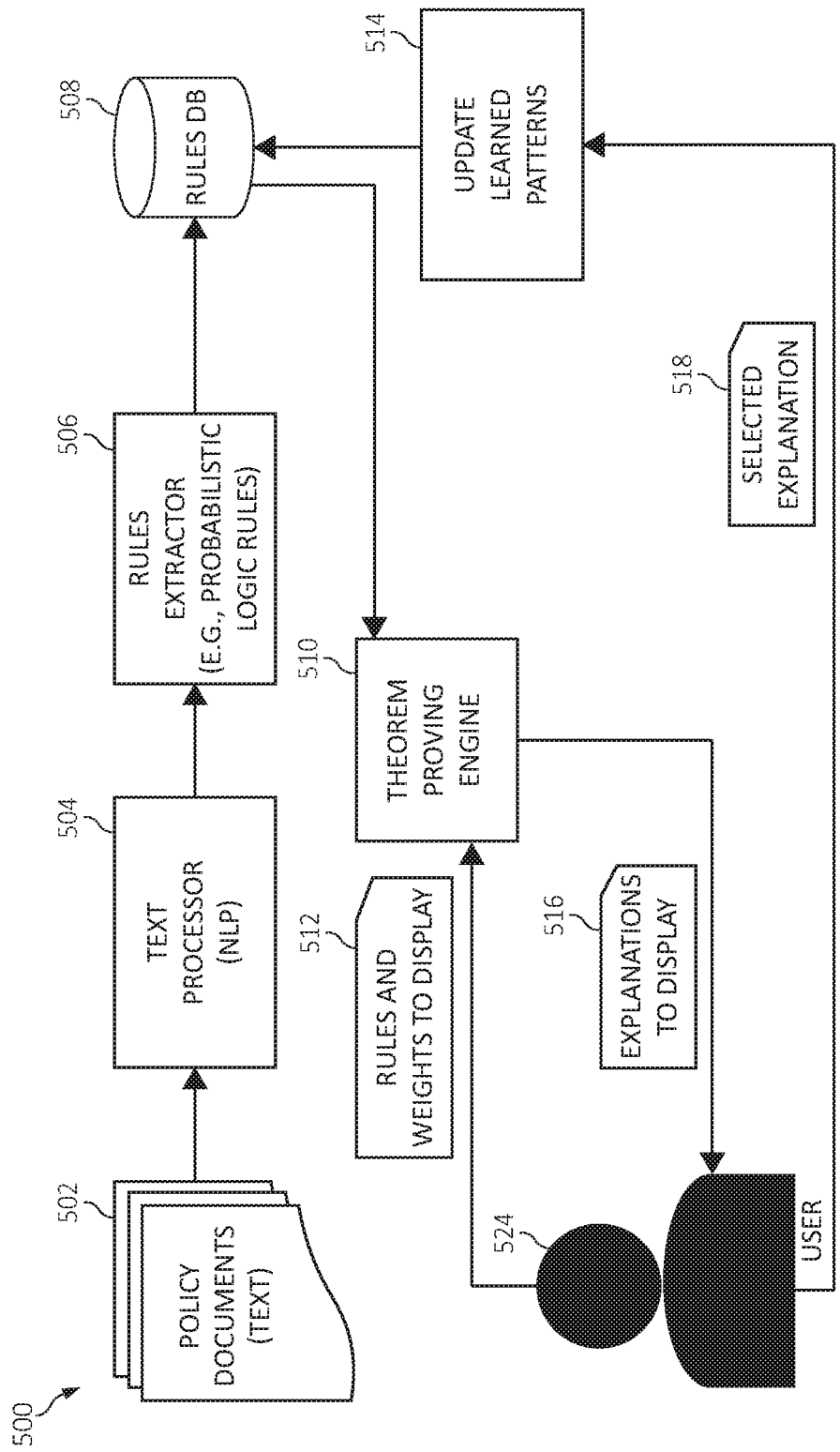
FIG. 5 is a flow diagram for learning policy explanations in accordance with aspects of the present invention.

Turning now to FIG. 5, block/flow diagram 500 is depicting for learning policy explanations in a computing environment. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality described in FIG. 5.

Also, as shown, the various blocks of functionality are depicted with arrows designating the blocks' 500 relationships with each other and to show process flow. As will be seen, many of the functional blocks may also be considered "modules" or "components" of functionality. With the foregoing in mind, the module blocks 500 may also be incorporated into various hardware and software components of a system for managing regulatory compliance for an entity in accordance with the present invention. Many of the functional blocks 500 may execute as background processes on various components, either in distributed computing components, or on the user device, or elsewhere.

In one aspect, at block 504, text data from one or more policy data sources 502 (e.g., insurance policy documents or "text data") may be sent, received, and/or used by natural language processing ("NLP) operation (e.g., a text processor). The NLP operation may ingest text data and detect entities and rules using one or more AI operations and/or NLP processes.

In one aspect, the text data (e.g., an insurance policy document) of one or more policy data sources 502 may be provided by one or more content contributors (e.g., insurance provider/carrier). The one or more data sources may be provided as a corpus or group of data sources defined and/or identified. The one or more data sources may include, but are not limited to, data sources relating to one or more documents, regulatory documents, policy documents, legal documents, materials related to regulatory or legal compliance, emails, books, scientific papers, online journals, journals, articles, drafts, and/or other various documents or data sources capable of being published, displayed, interpreted, transcribed, or reduced to text data. The data sources may be all of the same type, for example, pages or articles in a wiki or pages of a blog. Alternatively, the data sources may be of different types, such as word documents, wikis, web pages, power points, printable document format, or any document capable of being analyzed, ingested, used by an NLP system and/or AI system to provide processed content. For example, the policy data sources may be processed using a lexical analysis, parsing, extraction of concepts, semantic analysis (e.g., wide-coverage semantic analysis), or a combination thereof and also may be processed to data mine or transcribe relevant information from the content of the policy data sources.

At block 506, a rules extractor component may extract one or more segments (e.g., sentences) with one or more rules/rule-like content/segments (e.g., content having direct or inferential semantics that indicate one or more obligations relating to a rules, law, policy, regulation, or a combination thereof relating to the policy document).

That is, the rules extractor component 506 may extract one or more rules from the ingested text data. In one aspect, the rules extractor component may be a machine learning ("ML") sentence classifier that determines if a clause is a rules. The extraction of one or more rules/rule-like content/segments (e.g., sentences) may include, but is not limited to, extraction of information through a knowledge generation process that may include initial data collection among different sources (e.g., one or more policy documents).

A database ("DB" or knowledge domain) of rules may be enriched, enhanced, updated, replaced, and/or added to using the extracted rules, as in block 508. That is, the extraction of one or more rules, concepts and topics may include, but is not limited to, performing knowledge extraction from natural language text documents including reading input text; transforming the input text into a machine understandable knowledge representation so as to provide knowledge libraries (e.g., within the database/knowledge domain) from said documents; and using semantic based means for extracting concepts and their interrelations from said input text. Knowledge structures of the database/knowledge domain may be used consisting of rules, or other concepts and topics, such as rule-like obligations and violations, and the interrelations of the rule-like obligations and violations.

A theorem proving engine 510 may receive one or more policy claims 512 from user 524. The theorem proving engine 510 may analyze, process, validate/invalidate, and/or provide one or more explanations justifying validity or invalidity of a claim based on the rules extracted from one or more segments of text data of the policy data source 502 using a machine learning operation. That is, the theorem proving engine 510 may generate the one or more explanations 516 (e.g., explanations to display to the user 524) as proof trees using an automated theorem proving operation.

A scoring and ranking function, using the theorem proving engine 510 may be performed on the explanations 516 to score the one or more rules indicating a probability of likeliness to be included in the explanation 516 according to the assigned score (e.g., weighted values "weights").

The theorem proving engine 510 may also provide the one or more explanations 516 to the user 524 such as, for example, in a graphical user interface ("GUI") of a user equipment ("UE") (e.g., a smart phone, tablet, computer, etc.). The user 524 may select one or more explanations (e.g., selected explanation 518) most relevant to the user 524. The ranked rules and assigned score/weights may be sent to a user 524.

The selected explanation(s) 518 by the user may be sent back to the enriched rules DB 508 and the ranked rules and assigned score/weights (which may be included in the selected explanation 518) may be updated in the enriched rules DB 508 (e.g., update cost of the rules), as in block 514. Other user-based feedback relating to the ranked rules and assigned score/weights may also be received and sent back to the enriched rules DB 508. The updated, ranked rules and updated, assigned score/weights and other provided user-based feedback may be used to learn and/or updated learned patterns, modifications, changes, and/or to the rules so as to indicate which of the rules have a probability. One or more learned models may be sent back to the enriched rules DB 508. It should be noted that the "learned model" is a machine learning model that is learned from a set of positive and negative example rules (i.e., correct and incorrect rules). For example, one learned model may be a decision tree or an artificial neural network ("ANN") that takes as input a rule and returns a label such as "correct rule" or "incorrect rule." The incorrect rules may then be presented to the user. Once the user corrects the rule, then the system can use this feedback from the user to further train and improve the machine learning model.

Figure 6B:
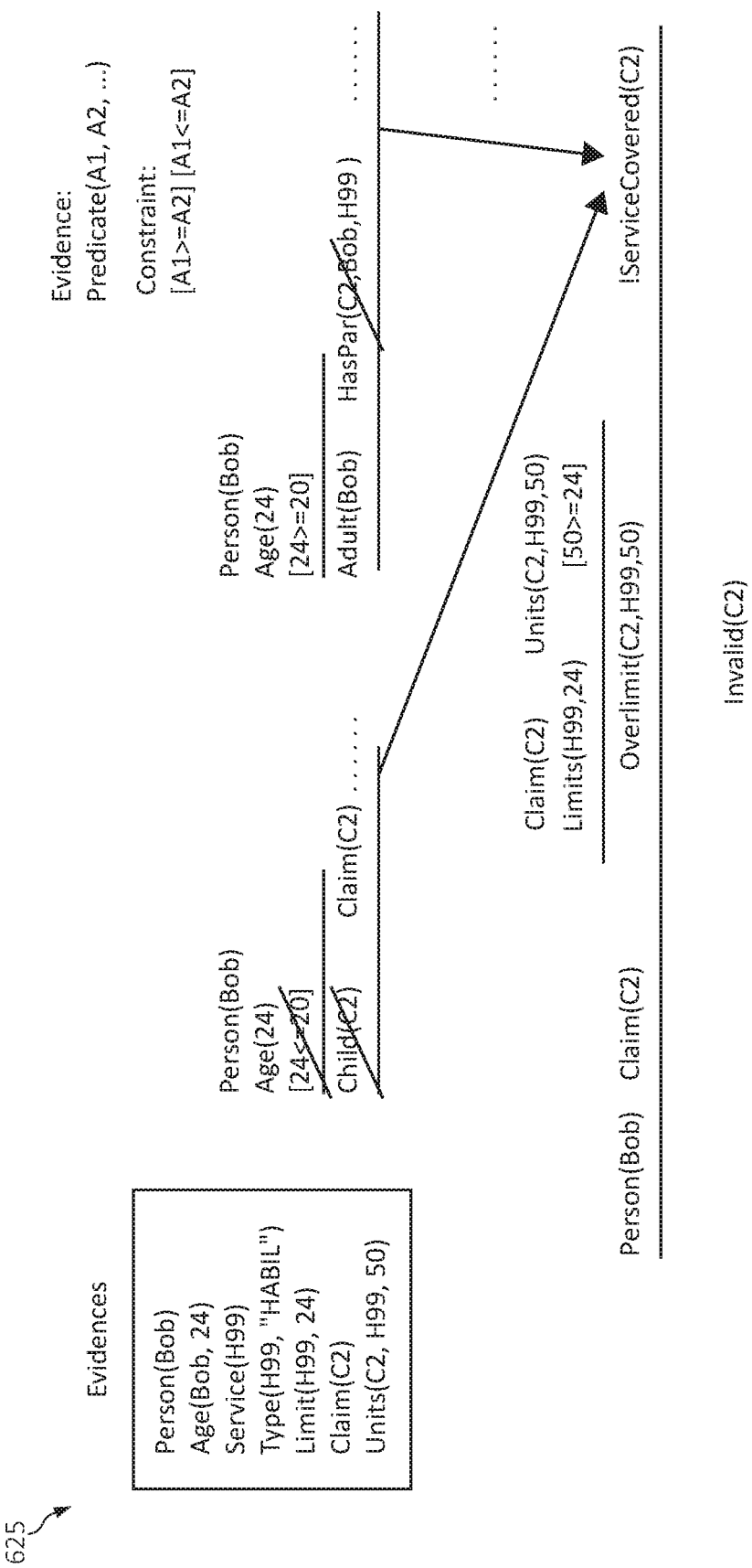

Turning now to FIG. 6A, diagram 600 illustrates policy rules as a Markov logic network having predicates and rules. Using the policy rules as a Markov logic network having predicates and rules, diagram 625 of FIG. 6B depicts extracting theoretical proof from the evidence and logical rules.

As illustrated, evidence may be an instantiated predicated regarded as true. Evidence may be obtained from a claim (e.g., evidences box of instantiated predicates such as, for example, person(Bob), Age (Bob, 24), Service (H99), (Type (H99, "HABIL"), Limit (H99, 24), claim (C2), Units (C2, H99, 50) Other instantiated predicates marked with "*" as illustrated in FIGS. 6A-6B may be regarded as false.

For example, one or more claims may be converted to a set of evidences (e.g., explanations). A non-negative cost may be defined (which is different from a weight of Markov Logic Network) for each rule indicating a degree or level of important/relevance to display to a user. That is, the cost is assigned to each rule, indicating degree or level of important/relevance it is to explain that rule. First, it should be noted that the cost of FIG. 6B is different from the numbers in FIG. 6A (which are weights indicating confidence scores of the rules. In one aspect, it may be assumed that all the rules are always correct and that the smaller cost is always preferred as a choose for an explanation.

For example, assume that the rule of a person has a cost of 10,000 and another person has a cost of 10 such as, for example, Person(x), Age(x,a), and "a" (which is less than or equal to 20 years of age (e.g., [a<=20])) is equal to or less than Child(x) has a cost of 10000, and the rule for Adult(x), of Claim(c), of Type(s, "HABIL"), Eligible(x), HasPAR(c, x,s) is equal to or less than (=>) the service covered (e.g., ServiceCovered(c,x,s)) has a cost of 10. Then, the theorem proving engine may prefer including the explanation about the services covered (e.g., "ServiceCovered") rather than the explanation about a person is a child.

At first, the cost for each rule may be assigned uniformly (or may be biased based on heuristics), and the theorem proving engine (e.g., a cost updating engine) attempts to optimize the cost for each rule by using collected-user feedback. A value update operation may reduce costs for the rules involving a best explanation (e.g., top ranked explanation) chosen by the user, and may increase costs for the rules involving the other explanations not chosen by the user, until the costs are updated to a selected threshold/level.

In one aspect, the smaller the cost is the greater the degree or level of important/relevance for an explanation. A theorem-proving operation may be performed using the evidences and logical rules. A grounding operation may be performed, which translates the theorem-proving into and/or graph search. The theorem-proving operation may generate and/or provide a proof tree that includes a minimum solution cost.

In one aspect, one or more explanations may be generated by leveraging one or more parts of the proof tree. For example, one or more candidate explanations may be generated as follows. Explanation 1: "Bob's claim is invalid, because it is an over limit claim, and he is an adult, and does not request participating insurance ("PAR"). Explanation 2-"Bob's claim is invalid, because the claim is an over limit claim and he is not a child." The user may select the most useful explanation of all generated. The costs of the rules used for an explanation selected by the user may be reduced, and the costs (e.g., scores) of the rules used for an explanation that are not selected by the user may be increased. The procedures may be repeated until costs assigned to the rules are converged. The speed to converge the costs of the rules may be controlled by gradually decreasing the so-called learning rate.

To further illustrate the overview theorem proving and proof tree of FIGS. 6A-6B, consider the following for the evidences, equation (A1, A2, . . . , Ak)/B, !B, and Invalid (C2), as illustrated therein.

In relation to the equation (A1, A2, . . . , Ak)/B, 1), evidence predicates A1, A2, . . . , Ak are called premises and B is a conclusion. 2). The evidence box represents one step reasoning indicating that B is true if A1, A2, . . . , Ak are true (which may also be written as A1, A2, Ak is equal to or greater than ("=>") B). 3). In order to conclude that B is true, the theorem proving engine attempts to: (a) find one or more instantiated rules forming: A1, A2, . . . , Ak=>B, and/or (b) prove that all of A1, A2, Ak are true. 4). If Ai (1<=i<=k) is evidence, Ai is true. If not, step 3 needs to be recursively applied for Ai until proving that Ai is true. 5). Finding a proof that B is true may be constructing a ground formed as a tree called by the proof tree. In this tree, A1, . . . , Ak may be regarded as B's children, and the evidence predicates reached are the terminal nodes.

For !B (e.g., !ServiceCovered), in step 1) !B indicates that the theorem proving engine aims to prove B is not true (i.e., false). In step 2), if B is false from the instantiated predicates marked with "*", B is false (e.g., Person(John) is false since it is not evidence). In step 3), otherwise, the theorem proving engine attempts to: (a) find all instantiated rules including B in the conclusion, and (b) for each rule instantiation A1, A2, . . . , Ak=>B, prove at least one Ai (1<=i<=k) is false. In step 4), to prove 3(b), step 3) is recursively applied until proving that Ai is false. In step 5), the proof tree for this case is defined in an analogous way.

In relation to Invalid(C2), the theorem proving engine starts with an instantiated predicate indicating that a claim (e.g., Invalid(C2) in FIG. 6B) is invalid and repeats the above steps until constructing a proof tree for Invalid(C2), indicating that there is a way to satisfy that Claim C2 is invalid.

Figure 7:
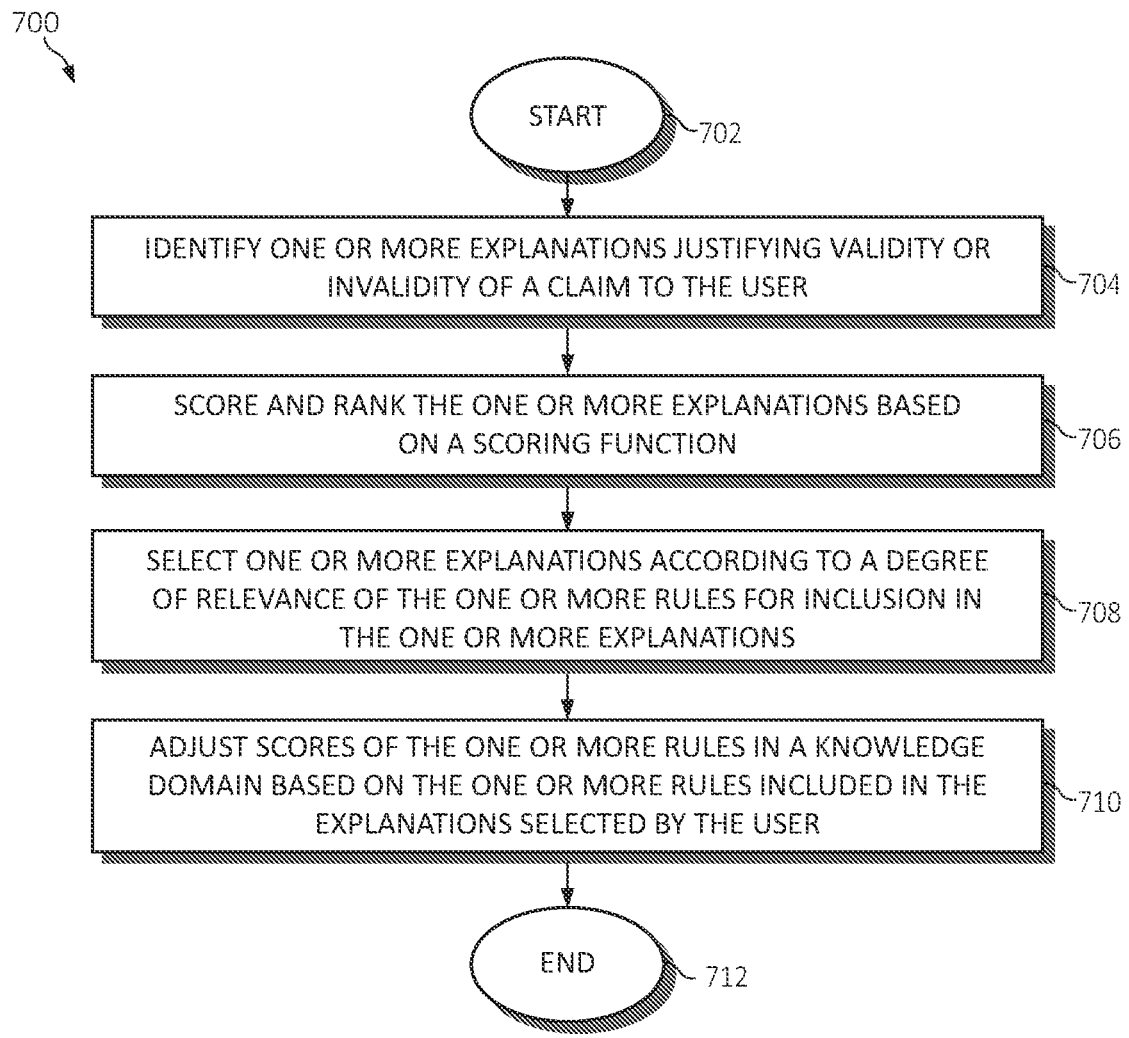
FIG. 7 is a diagram depicting policy rules as a markov logic network having predicates and rules in which aspects of the present invention may be realized.

Turning now to FIG. 7, a method 700 for learning policy explanations using a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

One or more explanations justifying validity or invalidity of a claim y be identified to the user, as in block 704. The one or more explanations may be scored (e.g., assigned a score) and ranked based on a scoring function, as in block 706. One or more explanations may be selected according to a degree of relevance of the one or more rules for inclusion in the one or more explanations (e.g., a degree of likelihood that the rules will be included in the one or more explanations), as in block 708. Each of the scores of the one or more rules in a knowledge domain may be adjusted based on the one or more rules included in the explanations selected by the user, as in block 710.

Figure 8:
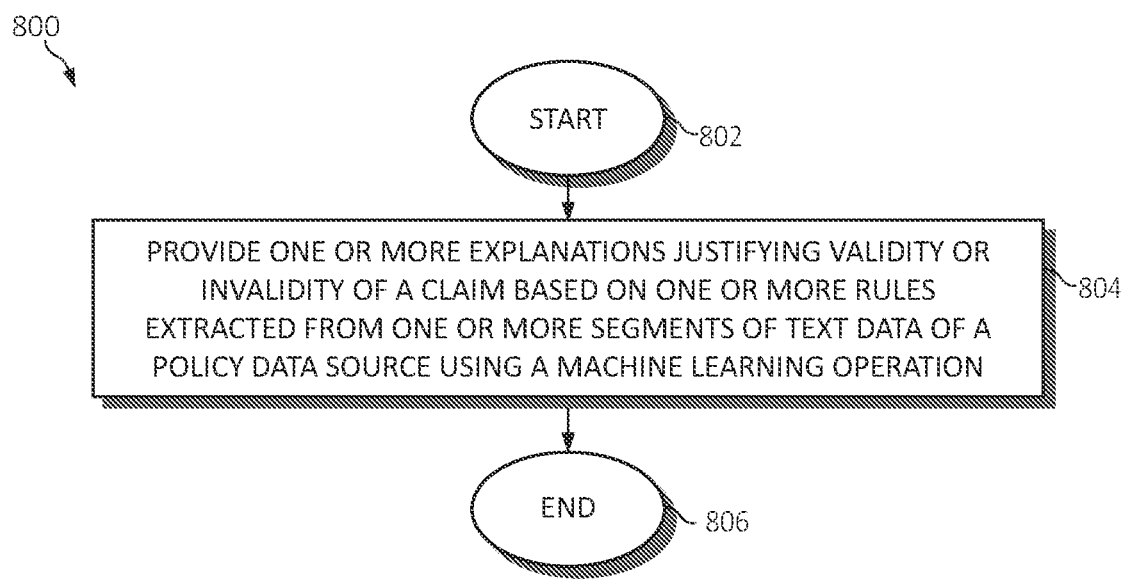
FIG. 8 is a diagram depicting a correcting policy data in which aspects of the present invention may be realized.

Turning now to FIG. 8, a method 800 for learning policy explanations using a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

One or more explanations may be provided to justify validity or invalidity of a claim based on one or more rules extracted from one or more segments of text data of a policy data source using a machine learning operation, as in block 804. The functionality 800 may end, as in block 806.

In one aspect, in conjunction with and/or as part of at least one blocks of FIGS. 7-8, the operations of 700 and/or 800 may include each of the following. The operations of 700 and/or 800 may ingest the text data from the policy data source upon processing the text data using a lexical analysis, parsing, extraction of concepts, semantic analysis, a machine learning operation, or a combination thereof, and/or use an NLP operation to determine the set of rules from one or more segments of text data.

The operations of 700 and/or 800 may generate the one or more explanations as proof trees using an automated theorem proving operation, and/or collect feedback from a user for learning a degree of relevance of the one or more rules for inclusion or exclusion in the one or more explanations.

The operations of 700 and/or 800 may assign a score to the one or more rules indicating a degree of relevance of the one or more rules for inclusion or exclusion in the one or more explanations according to a scoring operation, rank each of the one or more rules according to the assigned score, and/or adjust a score of the one or more rules in a knowledge domain according to the assigned score to the one or more rules included in the one or more explanations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for learning policy explanations in a computing environment by a processor comprising:
   ingesting text data from a policy data source into a data repository;
   executing machine learning logic to generate a policy rule model trained according to one or more rules extracted from the text data, wherein a classifier of the policy rule model identifies one or more segments of the text having clause-based obligatory language notwithstanding whether the clause-based obligatory language explicitly describes a rule, classifies the clause-based obligatory language as one or more rules, and determines bounds of the one or more rules outside of which the one or more rules are violated;
   responsive to receiving input of a claim via a user interface, providing, as output on the user interface, one or more explanations justifying validity or invalidity of the claim based on the one or more rules extracted from the one or more segments of the text data of the policy data source according to the executed machine learning logic;
   collecting feedback from a user for learning a degree of relevance of the one or more rules for inclusion or exclusion in the one or more explanations;
   assigning a cost to each of the one or more rules associated with the claim, and optimizing the cost by performing a value update operation according to the collected feedback, wherein the cost is indicative as to an importance that the one or more rules are utilized for the one or more explanations, and those of the one or more rules having a smallest cost subsequent to the value update operation are chosen as being referenced as a best explanation of the one or more explanations to provide to the user, and wherein, upon the user selecting a first provided explanation of the one or more explanations, the value update operation decreases the cost of a first rule of the one or more rules associated with the first provided explanation and increases the cost of a second rule associated with a second, unselected explanation of the one or more explanations until the costs of each of the one or more rules are updated to a threshold level; and
   executing the machine learning logic to iteratively update the policy rule model using the feedback collected from the user, wherein iteratively updating the policy rule model increases an accuracy in identifying and generating the one or more rules and the one or more explanations.

2. The method of claim 1, further including:
   processing the text data using a lexical analysis, parsing, extraction of concepts, semantic analysis, the machine learning logic, or a combination thereof; or
   using natural language processing (NLP) to determine the one or more rules from the one or more segments of the text data.

3. The method of claim 1, further including generating the one or more explanations as proof trees using an automated theorem proving operation.

4. The method of claim 1, further including ranking each of the one or more rules according to the assigned score.

5. The method of claim 1, further including adjusting a score of the one or more rules in a knowledge domain according to the assigned score to the one or more rules included in the one or more explanations.

6. A system for learning policy explanations in a computing environment, comprising:
   one or more processors with executable instructions that when executed cause the system to:
      ingest text data from a policy data source into a data repository;
      execute machine learning logic to generate a policy rule model trained according to one or more rules extracted from the text data, wherein a classifier of the policy rule model identifies one or more segments of the text having clause-based obligatory language notwithstanding whether the clause-based obligatory language explicitly describes a rule, classifies the clause-based obligatory language as one or more rules, and determines bounds of the one or more rules outside of which the one or more rules are violated;
      responsive to receiving input of a claim via a user interface, provide, as output on the user interface, one or more explanations justifying validity or invalidity of the claim based on the one or more rules extracted from the one or more segments of the text data of the policy data source according to the executed machine learning logic;
      collect feedback from a user for learning a degree of relevance of the one or more rules for inclusion or exclusion in the one or more explanations;
      assign a cost to each of the one or more rules associated with the claim, and optimizing the cost by performing a value update operation according to the collected feedback, wherein the cost is indicative as to an importance that the one or more rules are utilized for the one or more explanations, and those of the one or more rules having a smallest cost subsequent to the value update operation are chosen as being referenced as a best explanation of the one or more explanations to provide to the user, and wherein, upon the user selecting a first provided explanation of the one or more explanations, the value update operation decreases the cost of a first rule of the one or more rules associated with the first provided explanation and increases the cost of a second rule associated with a second, unselected explanation of the one or more explanations until the costs of each of the one or more rules are updated to a threshold level; and
      execute the machine learning logic to iteratively update the policy rule model using the feedback collected from the user, wherein iteratively updating the policy rule model increases an accuracy in identifying and generating the one or more rules and the one or more explanations.

7. The system of claim 6, wherein the executable instructions further:
   process the text data using a lexical analysis, parsing, extraction of concepts, semantic analysis, the machine learning logic, or a combination thereof; or use natural language processing (NLP) to determine the one or more rules from the one or more segments of the text data.

8. The system of claim 6, wherein the executable instructions further generate the one or more explanations as proof trees using an automated theorem proving operation.

9. The system of claim 6, wherein the executable instructions further rank each of the one or more rules according to the assigned score.

10. The system of claim 6, wherein the executable instructions further adjust a score of the one or more rules in a knowledge domain according to the assigned score to the one or more rules included in the one or more explanations.

11. A computer program product for, by one or more processors, learning policy explanations in a computing environment, the computer program product comprising a non-transitory computer-readable storage medium having computer-readable program code portions stored therein, the computer-readable program code portions comprising:

an executable portion that ingests text data from a policy data source into a data repository;

an executable portion that executes machine learning logic to generate a policy rule model trained according to one or more rules extracted from the text data, wherein a classifier of the policy rule model identifies one or more segments of the text having clause-based obligatory language notwithstanding whether the clause-based obligatory language explicitly describes a rule, classifies the clause-based obligatory language as one or more rules, and determines bounds of the one or more rules outside of which the one or more rules are violated;

an executable portion that, responsive to receiving input of a claim via a user interface, providing, as output on the user interface, one or more explanations justifying validity or invalidity of the claim based on the one or more rules extracted from the one or more segments of the text data of the policy data source according to the executed machine learning logic; an executable portion that collects feedback from a user for learning a degree of relevance of the one or more rules for inclusion or exclusion in the one or more explanations;

an executable portion that assigns a cost to each of the one or more rules associated with the claim, and optimizing the cost by performing a value update operation according to the collected feedback, wherein the cost is indicative as to an importance that the one or more rules are utilized for the one or more explanations, and those of the one or more rules having a smallest cost subsequent to the value update operation are chosen as being referenced as a best explanation of the one or more explanations to provide to the user, and wherein, upon the user selecting a first provided explanation of the one or more explanations, the value update operation decreases the cost of a first rule of the one or more rules associated with the first provided explanation and increases the cost of a second rule associated with a second, unselected explanation of the one or more explanations until the costs of each of the one or more rules are updated to a threshold level; and an executable portion that executes the machine learning logic to iteratively update the policy rule model using the feedback collected from the user, wherein iteratively updating the policy rule model increases an accuracy in identifying and generating the one or more rules and the one or more explanations.

12. The computer program product of claim 11, further including an executable portion that:

processes the text data using a lexical analysis, parsing, extraction of concepts, semantic analysis, the machine learning logic, or a combination thereof; or uses natural language processing (NLP) to determine the one or more rules from the one or more segments of the text data.

13. The computer program product of claim 11, further including an executable portion that generates the one or more explanations as proof trees using an automated theorem proving operation.

14. The computer program product of claim 11, further including an executable portion that ranks each of the one or more rules according to the assigned score.

15. The computer program product of claim 11, further including an executable portion that adjusts a score of the one or more rules in a knowledge domain according to the assigned score to the one or more rules included in the one or more explanations.

* * * * *